United States Patent [19]

Buchan

[11] 3,947,873

[45] Mar. 30, 1976

[54] METHOD AND CIRCUIT FOR DETECTING AND COMPENSATING FOR DROP-OUT AND DISTORTION OF FREQUENCY MODULATED VIDEO SIGNALS

[75] Inventor: William A. Buchan, Newport Beach, Calif.

[73] Assignee: BASF Aktiengesellschaft, Ludwigshafen (Rhine), Germany

[22] Filed: Sept. 19, 1974

[21] Appl. No.: 507,432

[52] U.S. Cl. .......................... 360/38; 178/69.5 DC
[51] Int. Cl.² ............................................ H04N 5/78
[58] Field of Search......... 360/38, 51; 178/69.5 DC, 178/6.6 DC

[56] References Cited
UNITED STATES PATENTS
3,865,981  2/1975  Welch et al. ............... 178/69.5 DC Primary Examiner—Raymond F. Cardillo, Jr.

[57] ABSTRACT

A circuit for use in a magnetic video tape recorder/playback system capable of detecting not only amplitude loss due to tape defects or loss of head-tape contact, but also zero crossing loss due to an increase of sideband amplitude with respect to carrier amplitude in the playback signal. The circuit comprises a high speed voltage comparator coupled to a one-shot and OR gate arrangement to cause the insertion of a compensating video signal should the FM playback signal fail to have a zero crossing and pass through a threshold level within a predetermined time period.

4 Claims, 5 Drawing Figures

METHOD AND CIRCUIT FOR DETECTING AND COMPENSATING FOR DROP-OUT AND DISTORTION OF FREQUENCY MODULATED VIDEO SIGNALS

BACKGROUND

Signal irregularities during the operation of a video tape recorder/playback system of the type disclosed in pending U.S. Pat. application Ser. No. 388,929, filed Aug. 16, 1973, allowed July 7, 1975, may result in visually detectable disturbances as a result of the low tape speed and small recording headgap used in these systems. Similar problems occur in the use of video disc recorder/playback systems of the type disclosed in German Published Patent Specification DAS No. 2,216,100. The disturbances may result from defects in the recording medium or from loss or reduction of contact between the playback head and the tape or disc. Another possibility is a loss of a zero crossing when a video transition from sync black to white is recorded. The result is demodulation of the signal as if a very low frequency had been recorded instead of the high frequency of peak white as intended. Disturbances of short duration may be rendered virtually imperceptable, however, by the insertion of a compensating video signal to span the time period during which the signal is lost or an erroneous interpretation would otherwise result. One example of such a compensating signal is a grey-level signal. Another example would be a repetition of the preceding line through the use of delay lines as discussed in pending U.S. Pat. application Ser. No. 507,433, filed Sept. 19, 1974.

In order to insert the compensating signal at the appropriate times it is known to use a detector to sense signal defects and to trigger a compensating signal generator. Some known detectors, however, are of the envelope type which only sense the dropping of the signal amplitude below a specified level. An example of such a detector is disclosed in U.S. Pat. No. 3,328,521. This type detector performs satisfactorily on the first class of problems mentioned above when the signal is lost due to a tape defect or reduction of contact pressure. The envelope type detector, however, is not capable of detecting the second class of problems, for monitoring the amplitude of the signal does not detect the loss of a zero crossing.

In the above referenced German Published Patent Specification DAS No. 2,216,100, a circuit for suppression of distortions during recording or playback of FM-modulated video signals in a video recording/playback system is disclosed. Such distortions consist of a loss of at least one portion of the FM-modulated video signal as occurs for instance, in a loss of zero crossings. To accomplish the suppression, this known circuit uses a special high pass filter inserted before the demodulator in the playback channel. The filter has a frequency limit lying lower than but close to the lowest frequency of the side bands of the modulated carrier frequency to be transmitted by the recording/playback system. This known circuit is only useful in suppressing such distortion and cannot be used to detect and compensate and cannot be used for dropouts and zero crossing defects.

A drop out detector is required, therefore, to detect all classes of signal irregularities. The present invention is such a drop out detector.

OBJECTS AND SUMMARY OF THE INVENTION

The primary object of this invention is to provide a circuit to detect not only amplitude losses but also losses of zero crossings in order to trigger the insertion of a replacement signal to minimize the visual disturbance which would otherwise result from the defective signal.

This and other objects will be readily apparent from the summary and description of the invention which follow.

The invention utilizes a high speed voltage comparator with a binary output (or outputs, depending on the embodiment) dependent upon whether the playback signal crosses zero and is above or below a threshold voltage. By coupling the output or outputs to a re-triggerable one-shot and OR gate arrangement, a binary output which goes low only if the FM playback signal does not have a zero crossing and pass through a threshold level within a predetermined period is generated. Should this output go low, a compensation signal is inserted into the playback signal, which has been delayed to permit the timely insertion of the fill-in signal.

DRAWINGS

Figure 1:
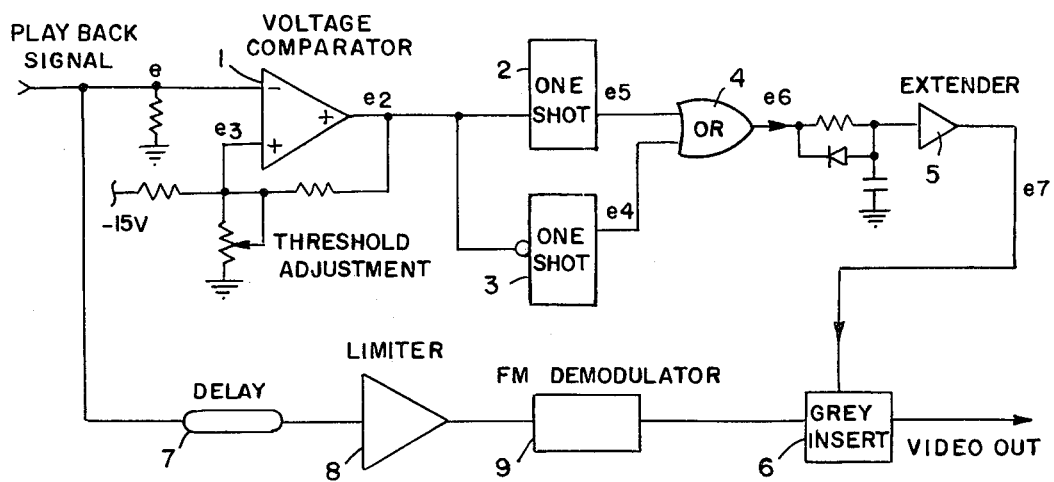
FIG. 1 is a schematic of one embodiment of the detection/compensation circuit.
Figure 2:
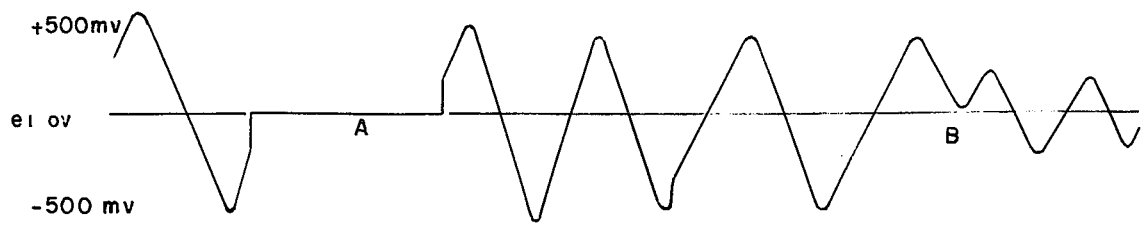
FIG. 2 shows a typical playback signal, a dropout and distortion.
Figure 3:
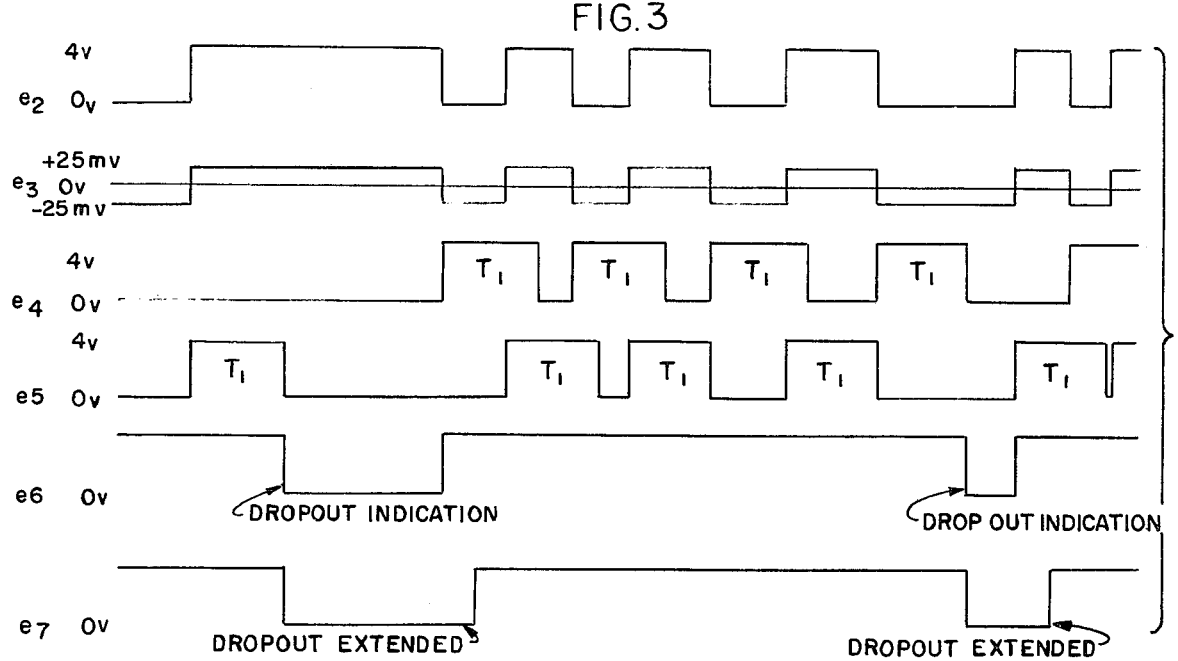

FIG. 3 indicates the voltage levels at various points in the circuit shown in FIG. 1 when the playback signal of FIG. 2 is applied to the circuit.

Figure 4:
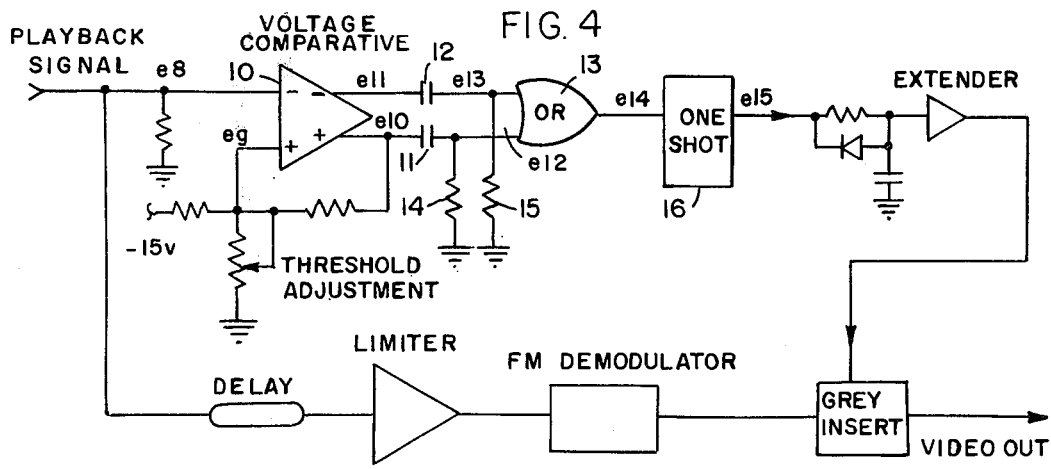

FIG. 4 is a schematic of a second embodiment of the detection/compensation circuit.

Figure 5:
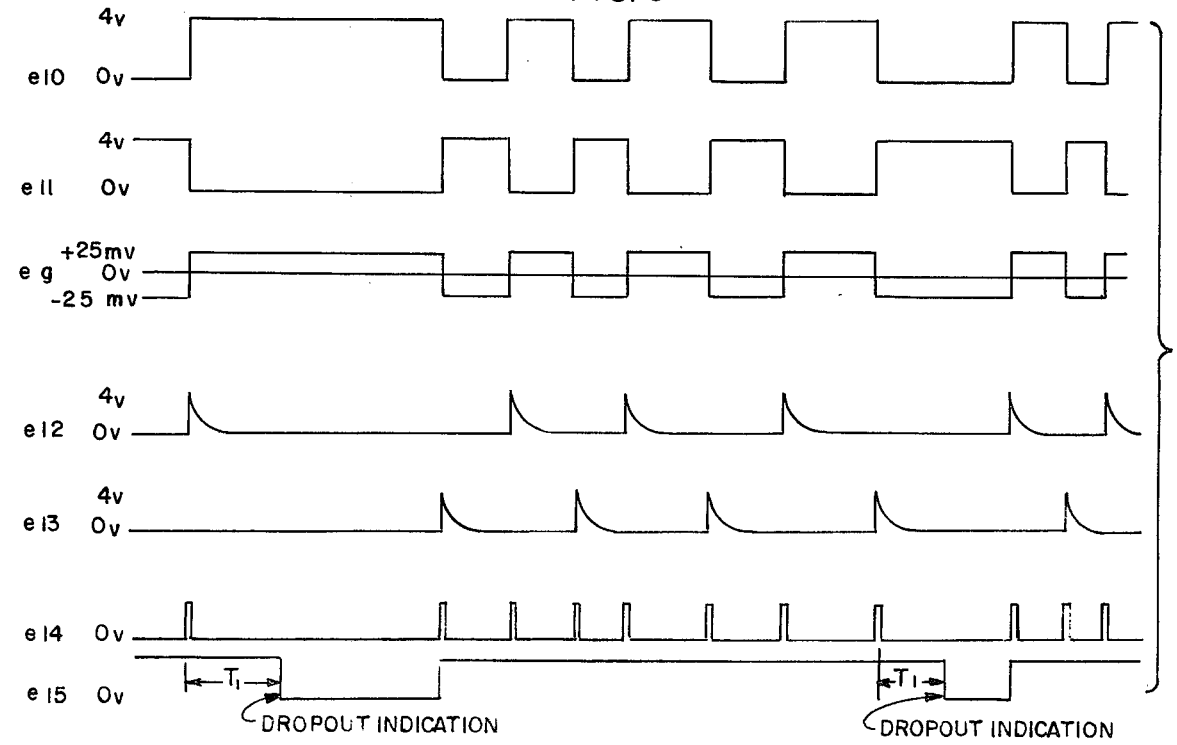

FIG. 5 indicates the voltage levels at various points in the circuit shown in FIG. 4 when the playback signal of FIG. 2 is applied to the circuit.

DETAILED DESCRIPTION OF THE DRAWINGS

The operation of one embodiment of the detection/compensation circuit may be shown by reference to FIGS. 1, 2 and 3. FIG. 1 is a schematic of the first embodiment of the circuit, while FIG. 2 is a typical FM playback signal, defects A and B of which serving to illustrate the capabilities of the invention. Defect A is a loss of amplitude which would be detected by a known amplitude detection scheme as well as by the present invention. Defect B, however, is of the type produced at a change from low to a considerably higher frequency as occurs when a video transition from black to white is being recorded. A known amplitude detection circuit would never detect this defect because it is responsive only to envelope dropouts. FIG. 3 indicates the voltage levels at various points in the circuit of FIG. 1 when the signal of FIG. 2 is applied as playback signal $e_1$.

Referring to FIG. 1, the playback signal $e_1$ follows two paths. Along the upper path, the signal is applied to the negative input of high speed voltage comparator 1 with positive feedback where it is compared to a preset threshold voltage $e_3$. In the embodiment shown, if the incoming voltage $e_1$ is sufficiently negative the output voltage $e_2$ will be at its maximum level (+4 volts, for example) and due to the positive feedback, the reference voltage $e_3$ will be slightly positive (+25 mv, for example). See FIG. 3. This means that the input signal $e_1$ would then have to exceed reference voltage $e_3$ before the output $e_2$ would switch to its minimum level (0 volts). Upon the switching of $e_2$ to its minimum level, reference voltage $e_3$ would in turn go slightly negative (−25 mv). This arrangement ensures that the comparator output $e_2$ switches only when the input voltage has definitely gone through zero and exceeded the reference voltage $e_3$ on the other side.

The switching of the output voltage $e_2$ of the comparator 1 is detected by two one-shots, 2 and 3. One-shot 2 is triggered by a positive-going edge, while one-shot 3 is triggered by a negative-going edge. Since the lowest frequency used in the FM recording is well defined, setting the output of each one-shot for a time period, $T_1$, greater than half the period of the lowest frequency assures that when monitoring a signal without defects at least one of the one-shots 2 and 3 will at all times provide an input, $e_4$ or $e_5$, to OR gate 4. Should the switching of the output voltage $e_2$ not occur within the time period $T_1$, however, the output $e_6$ of the OR gate 4 will go low.

A look at the system voltages in FIG. 3 at the time when defects A and B of FIG. 2 are encountered illustrates this operation. Since the magnitude playback signal voltage $e_1$ at defect A is less than the threshold voltage $e_3$ for a period of time $T_2$ which is longer than $T_1$, OR gate output $e_6$ switches to its minimum level as shown in FIG. 3. Similarly, due to the missed zero crossing at defect B, the time period $T_3$ between zero crossings is longer than $T_1$ and the output $e_6$ of OR gate 4 again switches to its minimum level.

The period during which the output $e_6$ of OR gate 4 is at its minimum level corresponds approximately to the period during which a compensating signal should replace defective playback signal. To further assure a signal replacement eliminating as completely as possible the effects of the defective signal, the output $e_6$ of OR gate 4 is extended by a few hundred nanoseconds at 5 before being connected to compensating signal generator 6.

Referring again to FIG. 1, the lower path of playback signal $e_1$ followed during the detection process described above includes a delay line 7 to provide the delay (400 nanoseconds, for example) prior to signal processing in order to allow the detector enough time to react and to synchronize the insertion of the compensating signal just prior to the time when the defective signal would otherwise appear on the screen.

Following the delay 7, the signal passes through an FM signal limiter 8 which switches at a much lower threshold (<5 mv, for example) than the threshold voltage $e_3$ (25 mv in this example) to ensure that voltage comparator 1 will detect a loss of zero crossing before the FM system stops operating.

After FM demodulation at demodulator 9, the signal is connected to a compensating signal generator 6 which, if distortion or a drop-out has been detected, is energized to replace the erroneous demodulated signal with a compensating signal such as grey-level signal or a repeated line, as explained above.

A second embodiment of the invention is shown in FIG. 4. As in the first embodiment a voltage comparator 10 compares playback signal $e_8$ to threshold voltage $e_9$. The voltage comparator 10 has dual outputs $e_{10}$ and $e_{11}$. The output $e_{10}$ in this embodiment is identical to the single output $e_2$ in the first embodiment. The binary output $e_{11}$ is the inverse of $e_{10}$. The outputs $e_{10}$ and $e_{11}$ are coupled through capacitors 11 and 12, respectively, to OR gate 13. The OR gate inputs $e_{12}$ and $e_{13}$ are grounded through resistors 14 and 15, respectively. This arrangement produces peaks in the respective input each time the outputs of the voltage comparator 10 switch from their minimum level to their maximum level. FIG. 5 shows the various voltage levels which result when the playback signal of FIG. 2 is applied to the circuit. As shown, a step followed by an exponential decay results each time there is an $e_8$ zero crossing followed by a voltage exceeding the magnitude of threshold voltage $e_9$. As indicated, the OR gate output $e_{14}$ switches to its maximum at each zero crossing for a period of time dependent upon the RC time constant associated with the OR gate inputs $e_{12}$ and $e_{13}$. Each time the OR gate output $e_{14}$ switches to its maximum level, retriggerable one-shot 16 switches from its minimum level to its maximum level for the same period of time $T_1$ used in the first embodiment. Or, if one-shot 16 has been previously triggered within the period of time $T_1$, the receipt of a re-triggering signal simply cause the output $e_{15}$ to remain high for a new period of time $T_1$ beginning from the receipt of the second signal. In this manner the output $e_{15}$ of one-shot 16 will remain at its maximum level at all times except when a defect in the signal exceeding the time period $T_1$ occurs.

As illustrated in FIG. 5, the one-shot output $e_{15}$ indicates a need for signal compensation when both defect A and defect B of FIG. 2 are sensed in the same way in which OR gate 4 indicated the signal defects in the first embodiment (see FIG. 3). The second embodiment has the advantage of requiring only one one-shot instead of two.

The description in specific detail may suggest various changes and other departures within the spirit and scope of the appended claims.

I claim:

1. A circuit, primarily for use with magnetic media video playback apparatus, to detect both signal drop-out and distortion in a frequency modulated signal, said circuit comprising:

a sensing means to detect and indicate when the voltage level of said frequency modulated signal passes from positive to negative and attains a threshold negative level and also to detect and indicate when the voltage level of said playback signal passes from negative to positive and attains a threshold positive level, said positive and negative threshold level being of substantially the same magnitude;

a timing means to indicate when the time period between said indications of threshold voltage level attainments exceeds a predetermined length;

a demodulator to demodulate said frequency modulated signal; and a signal replacement means to generate a fill-in signal to replace that portion of the demodulated signal corresponding to the portion of the frequency modulated signal which resulted in the indication of excessive time lapse between said zero crossings and threshold level attainments;

said sensing means comprising a dual output high speed positive feedback voltage comparator and said timing means comprising a logic gate having at least two inputs and one output, the inputs of said logic gate being coupled to the outputs of said voltage comparator in such a manner to provide short duration signals each time the respective outputs go positive and the output of which is connected to a retriggerable pulse generator whereby a signal of said predetermined length from said pulse generator to activate said signal replacement means is produced only when the time period between zero crossings and threshold level attainments exceeds said predetermined time.

2. A circuit as set forth in claim 1 wherein the coupling of said voltage compensator output and of said logic gate imputs is by capacitors grounded through resistors.

3. A circuit as set forth in claim 1 wherein the coupling of said voltage compensator outputs and of said logic gate inputs is through short duration pulse generators.

4. A circuit, primarily for use with magnetic media video playback apparatus, to detect both signal dropout and distortion in a frequency modulated signal, said circuit comprising:

- a sensing means to detect and indicate when the voltage level of said frequency modulated signal passes from positive to negative and attains a threshold negative level and also to detect and indicate when the voltage level of said playback signal passes from negative to positive and attains a threshold positive level, said positive and negative threshold level being of substantially the same magnitude;
- a timing means to indicate when the time period between said indications of threshold voltage level attainments exceeds a predetermined length;
- a demodulator to demodulate said frequency modulated signal; and
- a signal replacement means to generate a fill-in signal to replace that portion of the demodulated signal corresponding to the portion of the frequency modulated signal which resulted in the indication of excessive time lapse between said zero crossings and threshold level attainments;
- said sensing means comprising a high speed positive feedback voltage comparator and said timing means comprising (a) two pulse generators, the first of which is triggered by a positive going edge in the output from said voltage comparator, the second of which is triggered by a negative going edge in the output from said voltage comparator, and (b) a logic gate, a maximum level signal from which is generated during the excess over said predetermined time period between said zero crossings and threshold level attainments.

* * * * *